Oct. 12, 1954 YUEN TZE LO 2,691,730

WIDE BAND ANTENNA

Filed March 25, 1954 3 Sheets-Sheet 1

Y. T. Lo
INVENTOR.

BY Darby & Darby
ATT'YS

Y. T. Lo
INVENTOR.

BY Darby & Darby
ATT'YS

Oct. 12, 1954

YUEN TZE LO 2,691,730

WIDE BAND ANTENNA

Filed March 25, 1954

3 Sheets-Sheet 3

INVENTOR.
Yuen Tze Lo

BY Darby & Darby
HIS ATTORNEYS,

Patented Oct. 12, 1954 2,691,730

UNITED STATES PATENT OFFICE 2,691,730

WIDE BAND ANTENNA

Yuen Tze Lo, Ellenville, N. Y., assignor to Channel Master Corporation, Ellenville, N. Y., a corporation of New York Application March 25, 1954, Serial No. 418,553

18 Claims. (Cl. 250—33.57)

The present invention relates to broad band antennas and particularly to antennas useful in reception of television broadcasts.

Under the frequency and channel allotments of the Federal Communications Commission, commercial television broadcasting is allocated to two bands in the very high frequency range. These are generally designated as the low and high bands, the low band extending between 54 and 88 megacycles per second, and the high band extending between 174 and 216 megacycles per second. This wide disparity between the two television channel bands, whereby one band has frequencies of the order of three times those of the other band, has created considerable difficulty in the provision of a single antenna structure capable of satisfactory performance over both these bands. Among the more important characteristics required for satisfactory performance are the following:

1. The antenna must have a useful gain over the entire range of reception, preferably with higher gain over the higher frequency channels, on which frequencies there is generally greater attenuation of the broadcast waves. Such gain is usually referred to as a simple tuned half wave dipole as a standard.

2. The antenna must have a substantially uniform impedance over the entire range of reception so that it can satisfactorily match a transmission line to which it is generally connected for supplying the received energy to a utilization device, such as a television receiver circuit. This uniform impedance characteristic can be defined in terms of actual impedance at the antenna terminals or in terms of standing wave ratio.

3. The antenna must provide a directivity pattern of useful character. In general, such a directivity pattern should discriminate against radiation impinging upon the antenna from undesired sources. For example, when the antenna is directed toward a transmitter, it is desirable that it have no reception from the opposite direction. This is sometimes termed having a good front-to-back radiation. In the desirable direction, however, it is usually desirable to have a directivity pattern of reasonable angular width, such as 35 to 40 degrees, in order that the antenna may receive energy from a number of broadcast stations even though not in exact alignment with one another, that is, even though the stations have somewhat different orientation with respect to the reception point.

In the past, various efforts and special configurations have been utilized in seeking these desirable features. The present invention provides these desirable features in a relatively simple structure of antenna which can be combined with a reflector to provide good front-to-back radiation without discarding the broad band characteristic provided.

According to the present invention, use is made of the fact that the high VHF band is essentially a third harmonic of the low VHF band, and a simple dipole configuration is provided which operates as a half-wave dipole antenna for the low band and as three half-wave dipoles on the high band. This arrangement is of great utility since it permits the full utilization of the low band antenna and by providing greater expanse of antenna, it affords greater interception of energy to maintain good gain characteristics for the high band antenna.

The principles and advantages of the present invention will become more fully apparent from consideration of the following description and the appended drawings which illustrate a number of forms of the present invention and their principles of operation, as follows.

Figure 1:
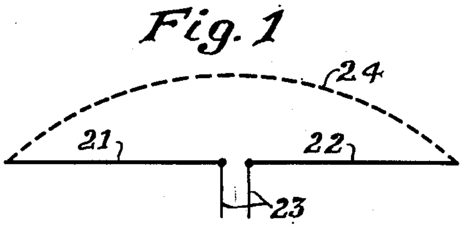
Fig. 1 is a schematic illustration of a simple resonant dipole, useful in explaining the principles of the present invention.
Figure 2:
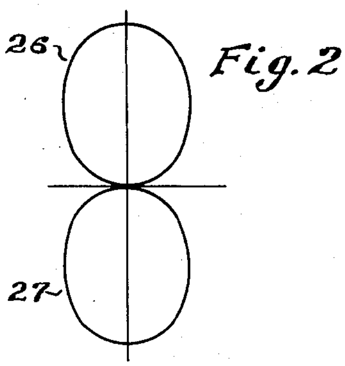
Fig. 2 shows a radiation pattern representative of the antenna of Fig. 1.

Fig. 1 illustrates schematically a simple half wave dipole having arms 21, 22 formed of colinear conductors joined at their adjacent ends to a transmission line 23 for connecting the antenna to a utilization apparatus such as a receiver. When such an antenna is excited at a frequency to which it is accurately attuned and at which its length is substantially a half wave length, the current distribution is essentially as shown by the dash curve 24 of Fig. 1, having a maximum at the center and tapering off to zero at the tips of the dipole arms. Under these circumstances, the polar diagram in a horizontal plane is as shown in Fig. 2, having a pair of lobes 26 and 27 generally of the familiar figure-eight pattern. The angular width of this polar diagram at the half power points is approximately 78°.

Figure 3:
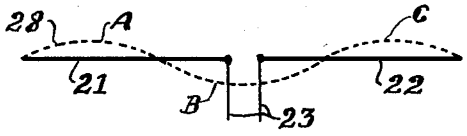
Fig. 3 is a similar schematic illustration of a simple dipole operated on its third harmonic.
Figure 4:
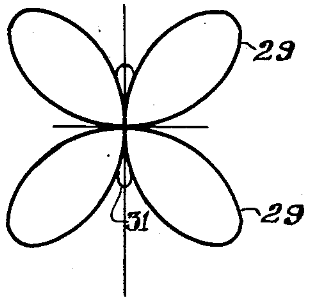
Fig. 4 shows a radiation pattern representative of the antenna of Fig. 3.

When the same antenna is operated at three times that frequency, the situation is as shown in Figs. 3 and 4, where Fig. 3 shows the current distribution wave 28 as having three loops A, B and C, where the center loop B is of opposite phase from the end loops A and C. The net result with respect to the transmission line 23 is that current loop B subtract from loops A and C, and the situation is the same as though there were three half-wave high band dipoles connected together, with the two outside dipoles in phase and the center dipole 180° out of phase, producing partial cancellation. The horizontal polar diagram is then as shown in Fig. 4, having four major lobes 29 at substantially the 45° orientation and with only the rather small minor lobes 31 along the desired direction of reception.

Figure 5:
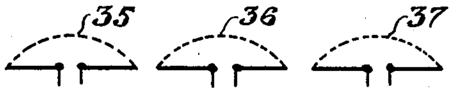
Fig. 5 is a similar schematic illustration of three in-line and in-phase high band simple dipoles.
Figure 6:
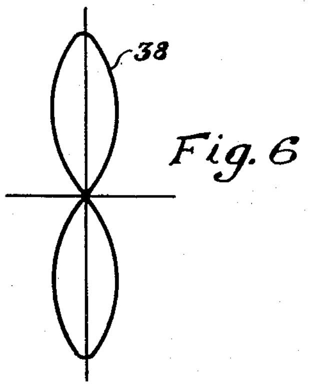
Fig. 6 shows a radiation pattern representative of the antenna of Fig. 5.

The desired situation would be similar to that of Fig. 5, showing three half-wave high band dipoles 32, 33 and 34, each having a respective in-phase current distribution 35, 36 and 37, producing the polar diagram in the horizontal plane as shown at 38 in Fig. 6. This diagram is narrower than the diagram of Fig. 2, having a half-power angular width of about 34°.

This arrangement of Fig. 5 would produce a calculated gain of 3.2 db, with respect to a single simple half-wave dipole on the high band, thereby not only avoiding the disadvantage of the lobe splitting illustrated by Fig. 4, but also having increased gain.

Figure 7:
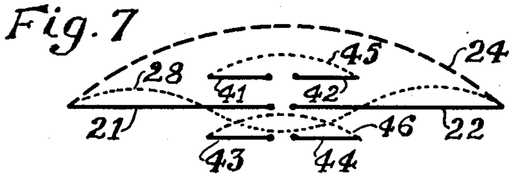
Fig. 7 is a schematic illustration of an antenna arrangement according to the present invention.

The present invention provides an antenna configuration which in fact does operate according to the principles of Figs. 1 and 2 on the low band, and Figs. 5 and 6 on the high band. This is illustrated by Fig. 7 showing an arrangement of three dipoles, one long dipole having arms 21, 22 and two short dipoles having arms 41, 42 and 43, 44 respectively. The dipoles 41, 42 and 43, 44 are designed to operate and are tuned to substantially the third harmonic of the resonant frequency of the dipole 21, 22 which may be selected to be within the low band and, for example, may be approximately at the geometric mean of the terminal frequencies of the low band, such as of a resonant frequency of the order of 65 megacycles, in which case the smaller dipoles would be resonant at substantially 195 megacycles, which is similarly an approximately geometric mean of the terminal frequencies of the high band.

When operating on the low band, at the resonant frequency of dipoles 21, 22, the current distribution is as shown at 24, being similar to that of Fig. 1. In this low band, the small dipoles have little effect because of their relatively small linear extent and wide departure from their resonant condition. On the high band, each of the small dipoles 41, 42 and 43, 44 will have a current distribution pattern such as at 45 and 46, which is similar to pattern 24 on the low band. The long dipole 21, 22 will have a pattern 28, the same as that of Fig. 2.

Figure 8:
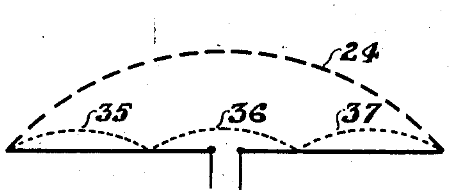
Fig. 8 is a schematic illustration of the equivalent of Fig. 7.

If the current distributions of all three of these antennas are added together, the resultant is as shown in Fig. 8, where again the dash line 24 shows the low band distribution while the dotted lines 35, 36 and 37 show the desirable high band distribution of the type illustrated in Fig. 5, equivalent to the output of three in-phase and in-line high band dipoles.

Figure 9:
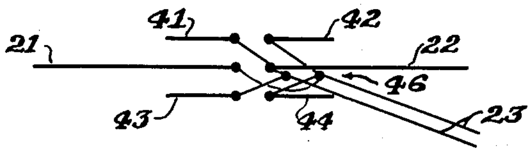
Fig. 9 is a schematic illustration of a physical form of antenna according to Fig. 7.

Fig. 9 shows schematically how the dipoles of Fig. 7 may be physically interconnected to provide this effect. In order that there be proper addition, it will be seen that the right arms 42 and 44 of the small dipoles must be connected directly together and to the left arm 21 of the long dipole. Similarly, the left arms 41, 43 of the small dipoles are connected together and to the right arm 22 of the long dipole. For interconnecting these dipoles, a transmission line harness 46 is provided, designed in accordance with considerations discussed below, which is connected in turn to the down-lead transmission line 23 supplying the receiver circuit or the like.

Figure 10:
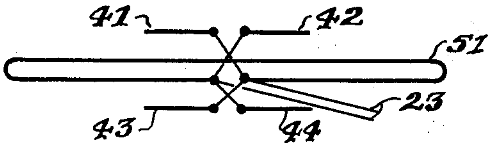
Fig. 10 is a similar schematic illustration of a modified arrangement.

While Fig. 9 illustrates the invention as applied to simple or straight dipoles, it is often desirable to maintain a higher impedance for the antenna arrangement, and this can be done, for example, by using a folded dipole for the low band and simple dipoles for the high band. This configuration is illustrated in Fig. 10, showing the low band folded dipole 51 and the two straight high band dipoles 41, 42 and 43, 44. This figure also shows an alternative coupling to down-lead 23. In this case, the two high band dipoles are each coupled directly to the low band dipole terminals, with proper phase reversal, and the down lead 23 is also coupled to these terminals.

Figure 11:
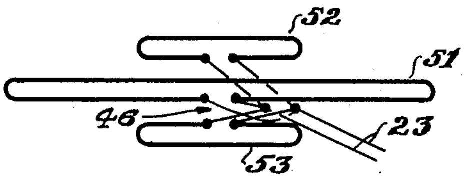
Fig. 11 is a similar schematic illustration of another arrangement.

To further improve the flatness of the response on the high band channels, folded dipoles may be used for all of the dipoles, and this is illustrated in Fig. 11, showing the low band folded dipoles 51 and the high band folded dipoles 52 and 53. In Fig. 11, it will be seen that the high band dipoles 52, 53 are connected by the harness 46 directly in parallel, and the low band dipole 51 is also coupled by harness 46 to down lead 23 with leads interchanged, to provide the phase reversal discussed above.

The dipole arrangement first described has the desirable half-wave operation condition on the low band and is equivalent to three in-line and in-phase half-wave dipoles operating on the high band. The directivity pattern of such antennas is essentially bidirectional. In normal use, it is desirable to have a unidirectional characteristic, which is most easily accomplished by use of a reflector arrangement.

A straight bar reflector may be utilized, which will provide a potential gain of approximately 3 db. However, this will be achieved only at one frequency, and not effectively on both the high and low bands. Accordingly, a more desirable reflector is a screen type, which has an optimum gain of approximately 7 db and is essentially non-resonant and non-frequency-selective. By providing a screen reflector large enough in area to give sufficient reflection at the low band, its size is more than adequate at the high band. Such a reflector is spaced approximately a quarter wave length from the dipole arrangement at the center frequency of the low band, which will be three quarter-wave-lengths at the center of the high band. Such an arrangement is illustrated in Fig. 12, showing the structure of a complete antenna arrangement of the present type, viewed in perspective from below.

Figure 12:
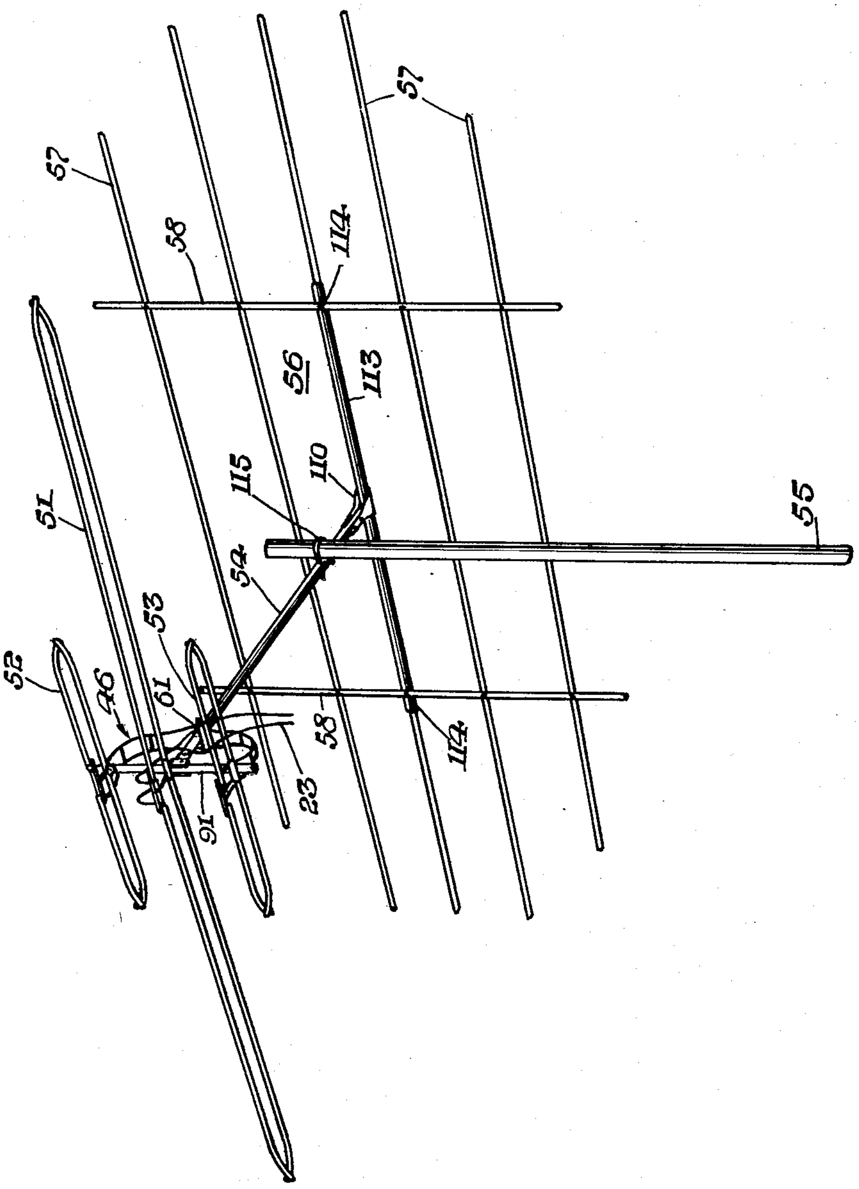
Fig. 12 is a perspective view of the structure of a preferred form of the present invention.

As shown in Figure 12, a long (low-band) folded dipole 51 is mounted substantially in a horizontal plane above and below which are the short-band folded dipoles 52 and 53, equally spaced therefrom, and also in respective horizontal planes. The long dipole 51 is substantially resonant at or near the center of the low band and may have an overall length, for example, of approximately 87 inches. The short dipoles are resonant at or near the center of the high band and may have a length for example, of approximately 28 inches. The spacing between the long dipole 51 and each of the short dipoles 52 and 53 should be far enough to avoid excessive inter-coupling and close enough to provide substantially in-phase operation. Such spacing must be less than a quarter wave length at all frequencies, and may desirably be 6 to 10 inches. It will be understood that these dimensions and all other dimensions and specific numbers used herein are merely illustrative of a desirable condition when the invention is used for standard television broadcast reception in this country, but these dimensions would normally be correspondingly changed or adjusted upon use of the invention at other frequencies or under other conditions.

All of the dipoles 51, 52, 53 are mounted on a vertical post 91 which in turn is secured to a horizontal cross arm 54, which is supported from a vertical mast 55. The cross arm 54 also supports the reflector screen 56, shown in this instance as a plurality of parallel horizontal rods 57 with a pair of joined vertical rods 58. A transmission line harness 46, described in detail below, interconnects the three dipoles 51, 52 and 53 to a terminal block 61 from which the down lead transmission line 23 extends to the receiver.

The reflector screen is made large enough to give wide band and essentially non-resonant effects, at both bands. For this purpose, its center horizontal rods 57 are made longer than the top and bottom rods, and longer than the long dipole 51. Thus, by way of example, the longer reflector rods may be 100 inches in length, and the shorter ones 80 inches in length. The whole screen reflector 56 may be 40 inches high. These dimensions are not critical but are minimum values, and have been found to be both economical and efficient ones.

Figure 13:
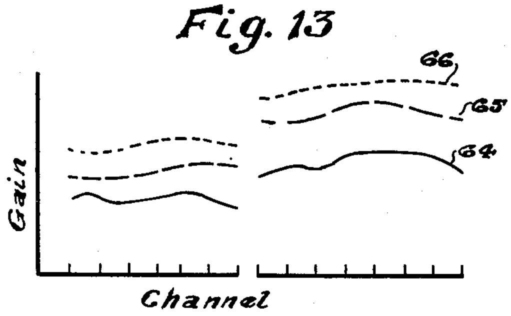
Figs. 13 to 15 are diagrams representative of the operation of the antenna arrangement of Fig. 12.
Figure 14:
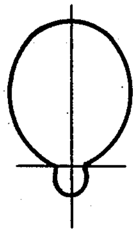
Figure 15:
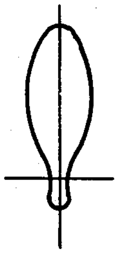

The electrical characteristics of such an antenna are illustrative in Figs. 13, 14 and 15. Fig. 13 is a curve illustrating the gain of such an antenna for various channels. The curve 64 is for a single antenna of the type shown in Fig. 12. Curve 65 shows a similar gain curve for a two-bay or stacked vertical array. Curve 66 shows a similar gain characteristic for a four-bay or double stacked array. As will be seen from Fig. 13, the gain is substantially uniform over the low band channels and also over the high channels, the high channel gain being higher than the low channel gain, as is desired for efficient response to compensate for the greater attenuation experienced at the high band by the broadcast waves.

Figs. 14 and 15 illustrate horizontal polar radiation or receptivity diagrams for two representative channels. For example, Fig. 14 may represent the pattern for low band channel 4 while Fig. 15 illustrates the pattern for high band channel 10. Each of these channels is at substantially the center of its band, and the channels on either side of each of them will have generally similar characteristics.

Figure 16:
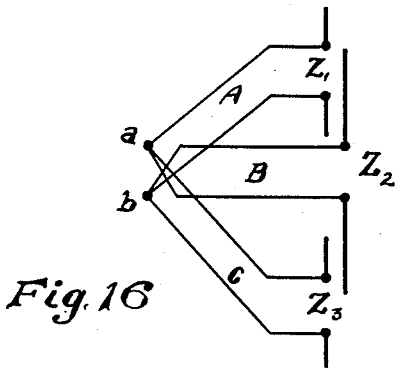
Fig. 16 is a schematic diagram useful in explaining the principles of the coupling harness.

An important feature of the present invention is the design and arrangement of the harness 46 coupling the three dipoles, which is now described with the aid of the circuit diagram of Fig. 16.

As shown in Fig. 11, the coupling harness 46 comprises three branches designated A, B, C in Fig. 16 each formed by a generally parallel-wire transmission line section. The three sections are joined in parallel at one end by connection to terminals *a—b*, and at the other end are connected to respective dipoles, indicated by $Z_1$, $Z_2$, $Z_3$ respectively.

Considering any one line section, from transmission line theory the voltage and current at *a*, *b* are functions of the voltage $V_1$ and current $I_1$ at the antenna as follows:

$$V_{ab}=V_1 \cosh \gamma l+I_1Z_A \sinh \gamma l$$

$$I_{ab}=I_1 \cosh \gamma l+\frac{V_1}{Z_A} \sinh \gamma l$$

where $\gamma$ is the propagation constant of the line, $l$ is the length and $Z_A$ is the characteristic impedance. For a quarter-wave length of line, with negligible loss, $$V_{ab}=jI_1Z_A$$

$$I_{ab}=jV_1/Z_A$$

Thus $V_{ab}$ is independent of the actual impedance $Z_1$ of the antenna, and is determined by the characteristic impedance $Z_A$. Thus, the output voltage $V_{ab}$ under these conditions is independent of the actual antenna impedances, and dependent only on the antenna currents and the line characteristic impedances. This is taken advantage of in the present case to derive a very useful resultant radiation pattern, which is determined by the relative magnitude and phase of the antenna currents, and not by impedance variations.

Considering first a resonant condition at the center of the high band, each small dipole will present about 300 ohms impedance. The long dipole is also resonant, and similarly presents about a 300 ohm impedance. If all three dipoles were coupled directly in parallel, a low net impedance of about 100 ohms would be attained. This would not be suitable, because of the general standardization of television receivers at 300-ohm input impedance and the use of 300-ohm transmission lines. However, according to the present invention, the line sections are made substantially one-quarter wave length long at the center of the high band, and have a characteristic impedance higher than 300 ohms. As a result, each antenna is transformed in impedance by its line section, and appears at terminals *a—b* (or 81) as a much higher impedance. By proper choice of characteristic impedance, they can be transformed to 900 ohms each, so that the parallel combination will have the desired 300-ohm value.

As shown above, $V_{ab}$ is proportional to the antenna current and to the harness characteristic impedance. Since the three antennas are coupled to common terminals, $V_{ab}$ is the same for each, and the antenna currents are thus directly proportional to the characteristic impedances of the harness branches. These are all equal, forcing the antenna currents to be equal.

By reversing the connections of the long dipole as shown in Fig. 11, the currents are all in-phase and directly added. Effectively, the reversed loop B of Fig. 3 is now cancelled out by the small dipoles and over-ridden to provide the desirable charateristic of Fig. 8, which produces increased gain on the high band where it is most needed. This effect is shown by curve 64 of Fig. 13.

Under these same conditions, when receiving at the center of the low band, the long dipole is again resonant and presents substantially a 300-ohm impedance. The short dipoles are far from resonant, and offer very large reactive impedances. The transmission line sections are now about $\frac{1}{12}$ wavelength, and provide little impedance transformation. The 300-ohm impedance hence appears at *a*—*b* in parallel with two large impedances, and the resultant is still about 300 ohms. Thus, at both low and high bands, the substantially same impedance value is attained. For frequency values on either side of the center frequencies the conditions vary slowly, so that substantially uniform impedance is obtained over both low and high bands.

The foregoing discussion has been based upon theoretical considerations, and in practice slight variations from theoretical conditions are experienced. Actually, even at resonance, the dipole impedances are not exactly 300 ohms, but differ somewhat from that value due to mutual coupling between dipoles and due to the effect of the reflector which tends to reduce the dipole impedance. Also, end effects for such line sections must be taken into account. In addition, slight compromises may be made to aid in obtaining acceptable values over the entire range. Hence, it has been found that, for the specific values given above, a characteristic impedance of about 450 ohms, and a length of harness branch of about 13 inches provide a desirable practical result. The average resultant impedance for the high band then is slightly below 300 ohms, while that for the low band is slightly more than 300 ohms, but highly acceptable values exist over the entire range of operation. It will be understood that changing various dimensions and spacings of the dipole and reflector arrangement will require some adjustment in the harness values just given.

While the small folded dipoles are shown as in horizontal planes parallel to that of the long dipole, that is not necessary in the broad aspects of the invention, but these small dipoles may be in other planes, such as vertical, in which case their mutual coupling to the long dipole is reduced and they may be positioned closer to the long dipole, as is desirable. Similarly, all three dipoles may have their planes at any desired angles to the horizontal.

Also, the axes of the three dipoles are shown horizontal only for illustrative purposes, that being the best position for conventional horizontally polarized waves. For other polarizations, the antennas may have their axes correspondingly oriented. For example, for vertical polarization, post 91 may be mounted horizontally, orienting the dipoles vertically for optimum reception.

It will be understood that the foregoing description is intended to be illustrative only, and the scope of the invention is defined solely by the appended claims.

What is claimed is:

1. A wide-band antenna arrangement suitable for television reception on low and high frequency bands where said high band has frequencies substantially three times those of said low band, comprising a first folded dipole mounted with its conductors in a single horizontal plane and tuned to a frequency substantially at the center of said low band, second and third folded dipoles, each mounted with its conductors in a single horizontal plane and respectively vertically above and below said first dipole, and spaced therefrom by less than a quarter wave length at any frequency in said bands, said second and third dipoles being tuned to a common frequency substantially at the center of said high band and at a third harmonic of said first frequency, a transmission line harness coupling all said dipoles to a pair of common terminals, said harness having three branches each formed as a transmission line section, said three branches each having one end coupled to a respective dipole and having another end coupled to said common terminals, each of said line sections having a length substantially equal to one quarter wave length at said center high band frequency and having a characteristic impedance approximately 50% higher than the desired output impedance of said antenna arrangement, the connection of said first dipole to said common terminals being reversed relative to the connections of said other dipoles, and a screen reflector arranged in a vertical plane spaced horizontally from said dipoles by substantially one quarter wave length at said low band center frequency, said reflector having a width and a height greater than that of said arrangement of dipoles and being substantially non-resonant, said reflector also being directly connected to the center of the uninterrupted conductor of each of said dipoles, whereby said antenna arrangement provides substantially uniform gain and directivity characteristics over each of said low and high bands.

2. A wide-band antenna arrangement suitable for television reception on low and high frequency bands where said high band has frequencies substantially three times those of said low band, comprising a first folded dipole mounted with its conductors in a single horizontal plane and tuned to a frequency substantially at the center of said low band, second and third folded dipoles, each mounted with its conductors in a single horizontal plane and respectively vertically above and below said first dipole, and spaced therefrom by less than a quarter wave length at any frequency in said bands, said second and third dipoles being tuned to a common frequency substantially at the center of said high band and at a third harmonic of said first frequency, and a transmission line harness coupling all said dipoles to a pair of common terminals, said harness having three branches each formed as a transmission line section, said three branches each having one end coupled to a respective dipole and having another end coupled to said common terminals, each of said line sections having a length substantially equal to one quarter wave length at said center high band frequency and having a characteristic impedance approximately 50% higher than the desired output impedance of said antenna arrangement, the connection of said first dipole to said common terminals being reversed relative to the connections of said other dipoles, a non-resonant reflector spaced horizontally from said dipoles by substantially one quarter wave length at said low band center frequency, whereby said antenna arrangement provides substantially uniform gain and directivity characteristics over each of said low and high bands.

3. A wide-band antenna arrangement suitable for television reception on low and high frequency bands where said high band has frequencies substantially three times those of said low band, comprising a first folded dipole mounted with its conductors in a single horizontal plane and tuned to a frequency substantially at the center of said low band, second and third folded dipoles, each mounted with its conductors in a single horizontal plane and respectively vertically above and below said first dipole, and spaced therefrom by less than a quarter wave length at any frequency in said bands, said second and third dipoles being tuned to a common frequency substantially at the center of said high band and at a third harmonic of said first frequency, a transmission line harness coupling all said dipoles to a pair of common terminals, said harness having three branches each formed as a transmission line section, said three branches each having one end coupled to a respective dipole and having another end coupled to said common terminals, each of said line sections having a length substantially equal to one quarter wave length at said center high band frequency and having a characteristic impedance approximately 50% higher than the desired output impedance of said antenna arrangement, the connection of said first dipole to said common terminals being reversed relative to the connections of said other dipoles, and a reflector spaced horizontally from said dipoles whereby said antenna arrangement provides substantially uniform gain and directivity characteristics over each of said low and high bands.

4. A wide-band antenna arrangement suitable for television reception on low and high frequency bands where said high band has frequencies substantially three times those of said low band, comprising a first folded dipole mounted with its conductors in a single horizontal plane and tuned to a frequency substantially at the center of said low band, second and third folded dipoles, each mounted with its conductors in a single horizontal plane and respectively vertically above and below said first dipole, and spaced therefrom by less than a quarter wave length at any frequency in said bands, said second and third dipoles being tuned to a common frequency and substantially at the center of said high band and at a third harmonic of said first frequency, a transmission line harness coupling all said dipoles to a pair of common terminals, said harness having three branches each formed as a transmission line section, said three branches each having one end coupled to a respective dipole and having another end coupled to said common terminals, each of said line sections having a length substantially equal to one quarter wave length at a frequency in said high band and having a characteristic impedance higher than the desired output impedance of said antenna arrangement, the connection of said first dipole to said common terminals being reversed relative to the connections of said other dipoles, and a reflector spaced horizontally from said dipoles whereby said antenna arrangement provides substantially uniform gain and directivity characteristics over each of said low and high bands.

5. A wide-band antenna arrangement suitable for television reception on low and high frequency bands where said high band has frequencies substantially three times those of said low band, comprising a first folded dipole mounted with its conductors in a single horizontal plane and tuned to a frequency substantially at the center of said low band, second and third folded dipoles, each mounted with its conductors in a single horizontal plane and respectively vertically above and below said first dipole, and spaced therefrom by less than a quarter wave length at any frequency in said bands, said second and third dipoles being tuned to a common frequency substantially at the center of said high band and at a third harmonic of said first frequency, a transmission line harness coupling all said dipoles to a pair of common terminals, said harness having three branches each formed as a transmission line section, said three branches each having one end coupled to a respective dipole and having another end coupled to said common terminals, said line sections being equal in length, the connection of said first dipole to said common terminals being reversed relative to the connections of said other dipoles, and a reflector spaced horizontally from said dipoles whereby said antenna arrangement provides substantially uniform gain and directivity characteristics over each of said low and high bands.

6. A wide-band antenna arrangement suitable for television reception on low and high frequency bands where said high band has frequencies substantially three times those of said low band, comprising a first folded dipole tuned to a frequency substantially at the center of said low band, second and third folded dipoles, respectively vertically above and below said first dipole, said second and third dipoles being tuned to a common frequency substantially at the center of said high band and a third harmonic of said first frequency, a transmission line harness coupling all said dipoles to a pair of common terminals, said harness having three branches each formed as a transmission line section, said three branches each having one end coupled to a respective dipole and having another end coupled to said common terminals, said line sections being equal in length, the connection of said first dipole to said common terminals being reversed relative to the connections of said other dipoles, and a reflector spaced horizontally from said dipoles whereby said antenna arrangement provides substantially uniform gain and directivity characteristics over each of said low and high bands.

7. A wide-band antenna arrangement suitable for television reception on low and high frequency bands where said high band has frequencies substantially three times those of said low band, comprising a first folded dipole tuned to a frequency in said low band, second and third folded dipoles, respectively vertically above and below said first dipole, said second and third dipoles being tuned to a common frequency in said high band, a transmission line harness coupling all said dipoles to a pair of common terminals, said harness having three branches each formed as a transmission line section, said three branches each having one end coupled to a respective dipole and having another end coupled to said common terminals, said line sections being equal in length, the connection of said first dipole to said common terminals being reversed relative to the connections of said other dipoles, and a reflector spaced horizontally from said dipoles, whereby said antenna arrangement provides substantially uniform gain and directivity characteristics over each of said low and high bands.

8. A wide-band antenna arrangement suitable for reception on low and high frequency bands, comprising a first folded dipole tuned to a frequency in said low band, second and third folded dipoles, respectively vertically above and below said first dipole, said second and third dipoles being tuned to a common frequency in said high band, and a transmission line harness coupling all said dipoles to a pair of common terminals, said harness having three branches each formed as a transmission line section, said three branches each having one end coupled to a respective dipole and having another end coupled to said common terminals, each of said line sections having a length equal to a quarter-wave-length at said high band frequency, the connection of said first dipole to said common terminals being reversed relative to the connections of said other dipoles.

9. A wide-band antenna arrangement suitable for television reception on low and high frequency bands where said high band has frequencies substantially three times those of said low band, comprising a first folded dipole extending horizontally and tuned to a frequency in said low band, second and third folded dipoles, extending horizontally and respectively vertically above and below said first dipole, said second and third dipoles being tuned to a common frequency in said high band, and a transmission line harness coupling all said dipoles to a pair of common terminals, said harness having three branches each formed as a transmission line section, said three branches each having one end coupled to a respective dipole and having another end coupled to said common terminals, the connection of said first dipole to said common terminals being reversed relative to the connections of said other dipoles.

10. A wide-band triple-dipole antenna arrangement suitable for television reception on low and high frequency bands where said high band has frequencies substantially three times those of said low band, comprising a first dipole extending horizontally and tuned to a frequency in said low band, second and third dipoles extending horizontally and respectively vertically above and below said first dipole, said second and third dipoles being tuned to a common frequency in said high band, and means coupling said three dipoles to a pair of common terminals, the connection of said first dipole to said common terminals being reversed relative to the connections of said other two dipoles.

11. A wide-band antenna arrangement suitable for television reception on low and high frequency bands where said high band has frequencies substantially three times those of said low band, comprising a first dipole tuned to a frequency in said low band, second and third dipoles parallel to and on opposite sides of said first dipole, said second and third dipoles being tuned to a common frequency in said high band, and means coupling all said dipoles to a pair of common terminals, the connection of said first dipole to said common terminals being reversed relative to the connections of said other dipoles.

12. An antenna arrangement as in claim 11 wherein said coupling means comprises an impedance-transforming transmission line harness for providing a transformed impedance at said common terminals which is substantially uniform over said low and high bands.

13. A wide-band antenna arrangement, comprising a first dipole having a resonant frequency, second and third dipoles parallel to and on opposite sides of said first dipole, and resonant at a frequency of the order of three times said first resonant frequency, and means coupling all said dipoles to a pair of common terminals, the connection of said first dipole to said common terminals being reversed relative to the connections of said other dipoles, said coupling means comprising an impedance-transforming transmission line harness for providing a transformed impedance at said common terminals which is substantially uniform.

14. A wide-band antenna arrangement, comprising a first dipole having a resonant frequency, second and third dipoles coplanarly parallel to and on opposite sides of said first dipole, and resonant at a frequency of a different order of magnitude from said first frequency, and means coupling said dipoles to a pair of common terminals, the connection of said first dipole to said common terminals being reversed relative to the connections of said other dipoles.

15. A multi-band antenna array consisting of a first low band resonant dipole, a pair of high band resonant dipoles spaced closely to and parallel to said low band dipole, all said dipoles being in a common plane, and a coupling harness for coupling said dipoles to a pair of common terminals, said harness comprising three separate transmission line sections respectively joining said dipoles to said terminals, said high band dipoles being coupled in parallel to said terminals, and said low band dipole being coupled to said terminals in reverse phase.

16. An antenna array as in claim 15 wherein said line sections are of equal length.

17. An antenna array as in claim 16 wherein said line sections are substantially one quarter wave length long at a frequency in said high band.

18. A multi-band antenna array comprising a first dipole antenna, a pair of further dipole antennas disposed parallel to and on either side of said first dipole antenna, said pair of dipole antennas having a common resonant frequency approximately three times that of said first dipole antenna, and a coupling harness for connecting all said dipole antennas to a pair of common terminals, said harness comprising three equal length similar transmission line sections, each coupling a respective one of said dipole antennas to said terminals, the connection of said first dipole antenna being reversed relative to the connections of the others, and said line sections having a characteristic impedance higher than the resonant impedance of said dipole antennas and higher than the desired impedance at said terminals.

No references cited.